Sept. 14, 1954  C. T. HAWKES  2,689,164
GAS PURIFICATION
Filed Jan. 8, 1951
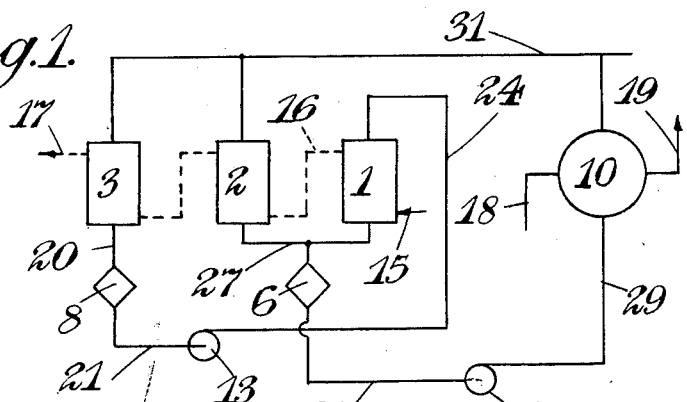
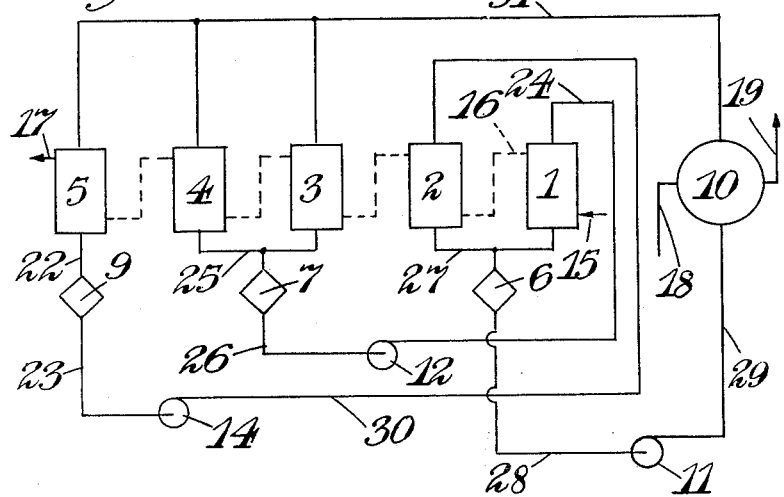
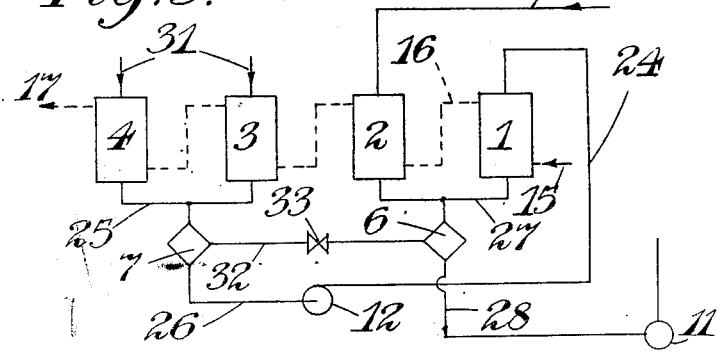
INVENTOR
CHARLES T. HAWKES
by Wilkinson Mawhinney
Attys.

Patented Sept. 14, 1954

2,689,164

UNITED STATES PATENT OFFICE 2,689,164

GAS PURIFICATION

Charles Trevor Hawkes, London, England, assignor to Humphreys & Glasgow Limited, London, England, a British company Application January 8, 1951, Serial No. 204,903

Claims priority, application Great Britain January 19, 1950

5 Claims. (Cl. 23—2)

This invention relates to the removal of hydrogen sulphide from gases by a succession of washings with an aqueous alkaline suspension of hydrated oxide of iron or carbonate or basic carbonate of iron which is regenerated or oxidised by passage therethrough of oxygen or air or gas containing oxygen.

In such a process the most effective purification of the gas is obtained if fresh or oxidised suspension is used in each gas-washing since such suspension is substantially free from sulphides particularly soluble sulphides.

The used suspension from later washings however is then much less sulphided than that from the earlier washings and indeed in some cases is hardly sulphided at all, and the costs of oxidation are high because of the large volume of liquor which is used to remove a given amount of hydrogen sulphide from the gas, and which has therefore to be pumped to the oxidiser and treated there.

Oxidation costs can therefore be reduced considerably if used iron suspension from one or more of the gas-washings is re-used without intermediate oxidation for earlier washing of the gas and it is the object of this invention to effect such an economy preferably without a corresponding loss in gas-washing efficiency.

According to this invention therefore in a process for removing hydrogen sulphide from gases by three or more successive washings with an aqueous alkaline suspension of hydrated oxide of iron, or carbonate or basic carbonate of iron which is oxidised (with oxygen or gas containing oxygen) for re-use, some only of the gas-washings, but at least two, are effected only with fresh suspension while the other gas-washing or each of the other gas-washings is effected only with used suspension from any later gas-washing. The expression "fresh suspension" as used in this specification and in the claims means new suspension or re-oxidized used suspension or a mixture of these.

The process of the invention will also remove, together with the hydrogen sulphide, certain associated impurities such as hydrogen cyanide, should these associated impurities be present.

Since the concentration of hydrogen sulphide in the gas decreases with each successive stage of the process, a gas-washing effected with used suspension from the immediately following gas-washing is not as effective as it would be were it effected with used suspension from a gas-washing later still in the series, the used suspension from which as it leaves that washing tower would have a lower content of soluble sulphides and would therefore be more efficient in hydrogen sulphide absorption.

On that account it is preferred that in the process of this invention any gas-washing effected with used iron suspension is performed only with such suspension from any later gas-washing other than its immediate successor.

Alternatively or in addition the efficiency of gas purification with used suspension may be improved by subjecting the used suspension before re-use to delay, for instance in a chamber or vessel, to promote substantial reduction in its content of soluble sulphides by reaction with the suspended iron compound, but the additional cost of chambers for this purpose constitutes a disadvantage.

Oxidation of used suspension is preferably preceded by a delay period for substantial reaction to take place between soluble sulphide and suspended iron compound.

It is understood that the invention is not limited to use with any one pattern or design of gas-washing apparatus, and it is also understood that used suspension may be withdrawn from the system for separation of sulphur and for other treatment, if desired, and may be then returned to use in the process or be replaced by new suspension.

The nature of this invention and the manner in which it is performed will be appreciated from the following description of examples, reference being made to the accompanying drawings in which:

Figures 1, 2 and 3 are flow diagrams illustrating three applications of the process of the invention.

Figure 1 shows an arrangement where the gas is subjected to three consecutive washings in the scrubbers 1, 2 and 3, while Figure 2 is an arrangement for five consecutive gas washings in scrubbers 1 to 5. Figure 3 shows an alternative arrangement of the first four scrubbers of Figure 2.

In all cases the gas passes through the scrubbers in series from right to left as shown by the dotted lines, entering the first scrubber 1 below at 15 and leaving it above at 16 and the purified gas leaving the system at 17. Alkaline iron suspension is fed by gravity to the tops of the scrubbers through suitable distributing means (not shown), passing downward in counter-current to the flow of gas therein and in contact with it and leaving the scrubbers below through suitable gas seals (not shown).

Thus, in the example of Figure 1 new or oxidised iron suspension from oxidiser 10 is fed from the pipeline 31 into the tops of scrubbers 2 and 3. The liquor leaving scrubber 3 through pipe 20 is separately collected and after suitable time of delay in vessel 8 for conversion of soluble sulphides into insoluble sulphides, is lifted from pipe 1 by pump 13 directly to the top of scrubber 1 where it contacts, in counter-current flow, the foul gas entering the purification plant.

Thus, suspension from that gas washing where there is the least degree of fouling or sulphiding of the suspension is re-used without intermediate oxidation for the initial removal of hydrogen sulphide from the gas, while the intermediate and final washing stages are effected only with new suspension or suspension that has been re-oxidised in oxidiser 10.

The used suspension from both scrubbers 1 and 2 passes through pipeline 27 into delay tank 6 and thence through pipeline 28 to pump 11 which returns it to the oxidiser 10. There it is oxidised for instance by compressed air forced via pipe 18 through diffusers (not shown) in finely divided streams through the suspension and leaving the oxidiser by the vent-pipe 19.

It is to be understood that used suspension may be withdrawn from the system as and when desired for sulphur removal and/or other treatment, or for disposal, and may be replaced by new suspension introduced for instance via pipeline 31. Also the delay tanks 6 and 8 while they may be desirable in certain circumstances are not essential.

In the scheme outlined in Figure 2 the gas is subjected to five consecutive washings in the five scrubbers 1 to 5 only three of which are fed with new or oxidised suspension. Thus, suspension from the oxidiser 10 passes by gravity via pipeline 31 to scrubbers 3, 4 and 5. The used suspension from the final scrubber 5, i. e. where there is the lightest degree of fouling of the suspension, is re-used without intermediate oxidation for the second washing of the gas, it being pumped by pump 14 from the delay tank 9 directly to the top of scrubber 2. The combined used suspension from washers 3 and 4 passing from pipe 25 into delay tank 7 is fed through pipe 26 by pump 12 through pipe 24 to the top of scrubber 1, and thus the foul gas entering the purification plant may be contacted with a larger quantity of suspension than in any of the subsequent washings.

The combined used suspension from scrubbers 1 and 2 passing through the pipeline 27 to delay tank 6 is passed thence via pipeline 28 and pump 11 through pipeline 29 to the oxidiser 10.

Figure 3 shows a variation of the arrangement of Figure 2 whereby the amount of suspension passed from scrubbers 4 and 3 to scrubber 1 may be varied by adjustment of valve 33 in connection 32 between the delay tanks 7 and 6 serving the pumps 12 and 11 respectively, and adjustment of the rate of delivery by those pumps.

I claim:

1. A process for removing hydrogen sulphide from gases comprising passing a stream of gases to be freed from hydrogen sulphide through a plurality of washing zones in series, washing said gases in each of said washing zones with an aqueous alkaline suspension of an iron compound selected from the class consisting of hydrated iron oxide, iron carbonate and basic carbonate of iron, which washing zones form two separate groups, a first group and a second group, only fresh suspension being supplied to the second group through which said stream of gases passes, which second group comprises a plurality of washing zones to which fresh suspension is supplied in parallel, and at least part of the used suspension leaving said second group being supplied without oxidation for re-use to the first group through which said stream of gases passes, which used suspension constitutes the only supply of suspension to each washing zone of the first group, each washing zone of the first group being supplied only with used suspension from a washing zone other than its immediate successor in the series.

2. A process as claimed in claim 1 in which the first washing zone through which said stream of gases passes is supplied with the whole of the used suspension leaving two washing zones of the second group.

3. A process as claimed in claim 1 in which the first washing zone through which said stream of gases passes is supplied with part of the used suspension leaving two washing zones of the second group, the remainder of the used suspension from said two washing zones being oxidized for re-use.

4. A process for removing hydrogen sulphide from gases comprising passing a stream of gases to be freed from hydrogen sulphide through a plurality of washing zones in series, washing said gases in each of said washing zones with an aqueous alkaline suspension of an iron compound selected from the class consisting of hydrated iron oxide, iron carbonate and basic carbonate of iron, which washing zones form two separate groups, a first group and a second group, only suspension which has passed through a washing zone and which has been oxidized with oxygen-containing gas for re-use being supplied to the second group through which said stream of gases passes, which second group comprises a plurality of washing zones to which said oxidized suspension is supplied in parallel, and at least part of the used suspension leaving said second group being supplied without oxidation for re-use to the first group through which said stream of gases passes, which used suspension constitutes the only supply of suspension to each washing zone of the first group, each washing zone of the first group being supplied only with used suspension from a washing zone other than its immediate successor in the series.

5. A process for removing hydrogen sulphide from gases comprising passing a stream of gases to be freed from hydrogen sulphide through a plurality of washing zones in series, washing said gases in each of said washing zones with an aqueous alkaline suspension of an iron compound selected from the class consisting of hydrated iron oxide, iron carbonate and basic carbonate of iron, which washing zones form two separate groups, a first group and a second group, only new suspension and suspension which has passed through a washing zone and which has been oxidized with oxygen-containing gas for re-use being supplied to the second group through which said stream of gases passes, which second group comprises a plurality of washing zones to which new suspension and oxidized suspension are supplied in parallel, and at least part of the used suspension leaving said second group being supplied without oxidation for re-use to the first group through which said stream of gases passes, which used suspension constitutes the only supply of suspension to each washing zone of the first group, each washing zone of the first group being supplied only with used suspension from a washing zone other than its immediate successor in the series.

References Cited in the file of this patent

UNITED STATES PATENTS

| Number | Name | Date |
| --- | --- | --- |
| 2,007,741 | Broche | July 9, 1935 |
| 2,503,528 | Walker et al. | Apr. 11, 1950 |